(12) United States Patent
Rogers et al.

(10) Patent No.: US 6,994,440 B2
(45) Date of Patent: Feb. 7, 2006

(54) ELEVATOR ASSEMBLY FOR A PROJECTION DEVICE

(75) Inventors: Tony Rogers, Milwaukie, OR (US); Greg Sample, Newberg, OR (US); Clark Wilson, Clackamas, OR (US)

(73) Assignee: InFocus Corporation, Wilsonville, OR (US)

(*) Notice: Subject to any disclaimer, the term of this patent is extended or adjusted under 35 U.S.C. 154(b) by 14 days.

(21) Appl. No.: 10/860,556

(22) Filed: Jun. 2, 2004

(65) Prior Publication Data

US 2004/0263805 A1 Dec. 30, 2004

Related U.S. Application Data

(60) Provisional application No. 60/475,244, filed on Jun. 2, 2003.

(51) Int. Cl.
G03B 21/16 (2006.01)
G03B 21/18 (2006.01)
G03B 21/22 (2006.01)

(52) U.S. Cl. .......................................... 353/119; 353/52
(58) Field of Classification Search ................... 353/57, 353/58, 61, 69, 70, 119, 52, 60, 122; 248/188.2, 248/188.8, 423, 371, 393, 397, 419–424; 348/787, 789; 352/243
See application file for complete search history.

(56) References Cited

U.S. PATENT DOCUMENTS

| | | | | |
|---|---|---|---|---|
| 6,302,543 B1 * | 10/2001 | Arai et al. | ..................... | 353/70 |
| 6,481,855 B2 * | 11/2002 | Oehler | ........................ | 353/70 |
| 6,715,890 B2 * | 4/2004 | Huang et al. | ............... | 353/119 |
| 6,789,904 B2 * | 9/2004 | Chang | ........................ | 353/119 |
| 2002/0140909 A1 * | 10/2002 | Tanaka | ........................ | 353/70 |

* cited by examiner

Primary Examiner—Melissa J Koval

(74) Attorney, Agent, or Firm—Alleman Hall McCoy Russell & Tuttle LLP

(57) ABSTRACT

An elevator assembly for use with a projection device is provided. In one embodiment, the elevator assembly may include a foot extension configured to contact a reference surface, and a one-piece substantially planar bracket configured to support the foot extension and slidably couple the foot extension with a housing of the projection device, wherein the bracket enables the foot extension to extend and retract relative to the housing of the projection device. In some embodiments, the bracket may be configured to slidably couple the foot extension with the housing via a snap fit connection.

3 Claims, 7 Drawing Sheets

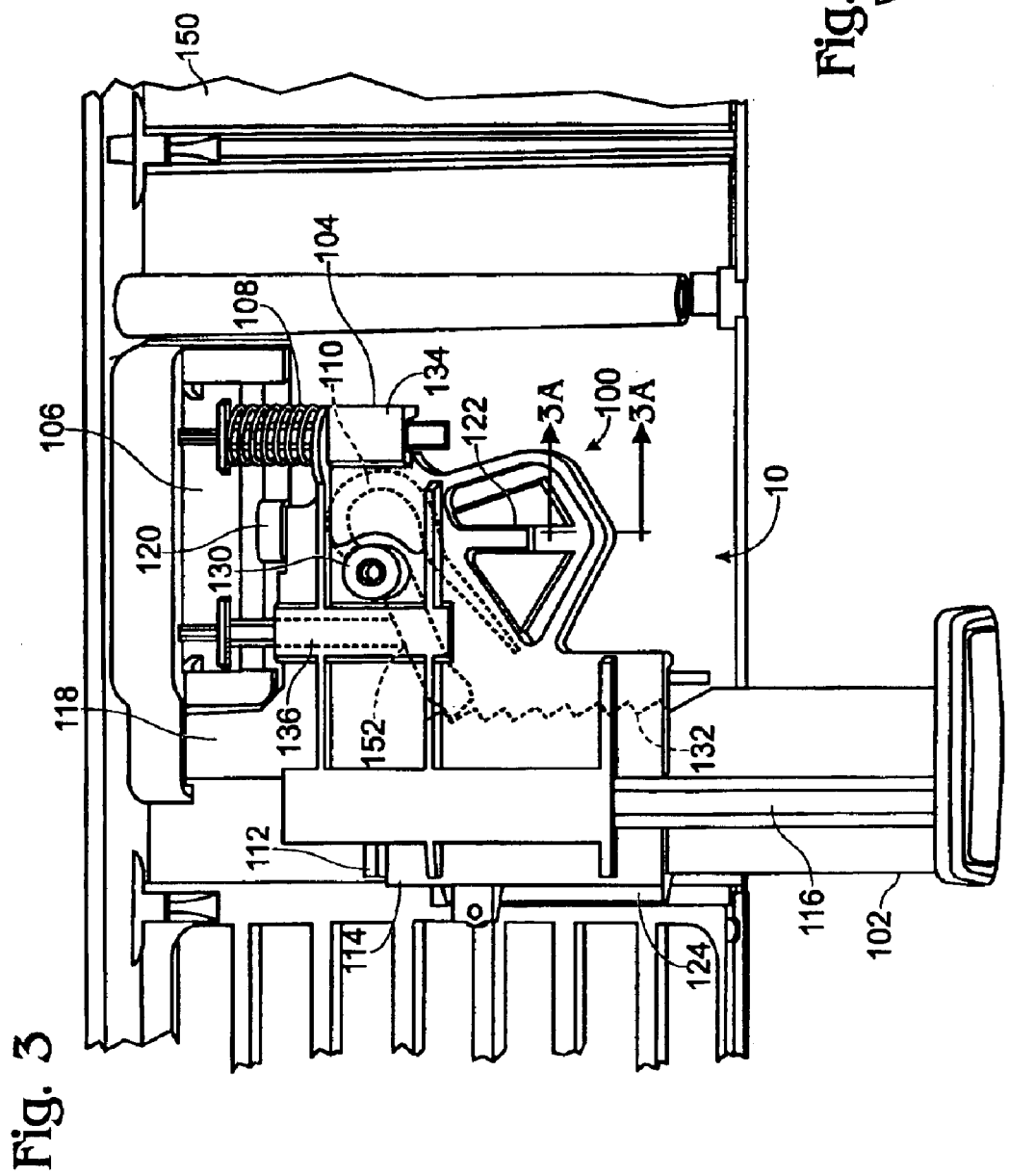

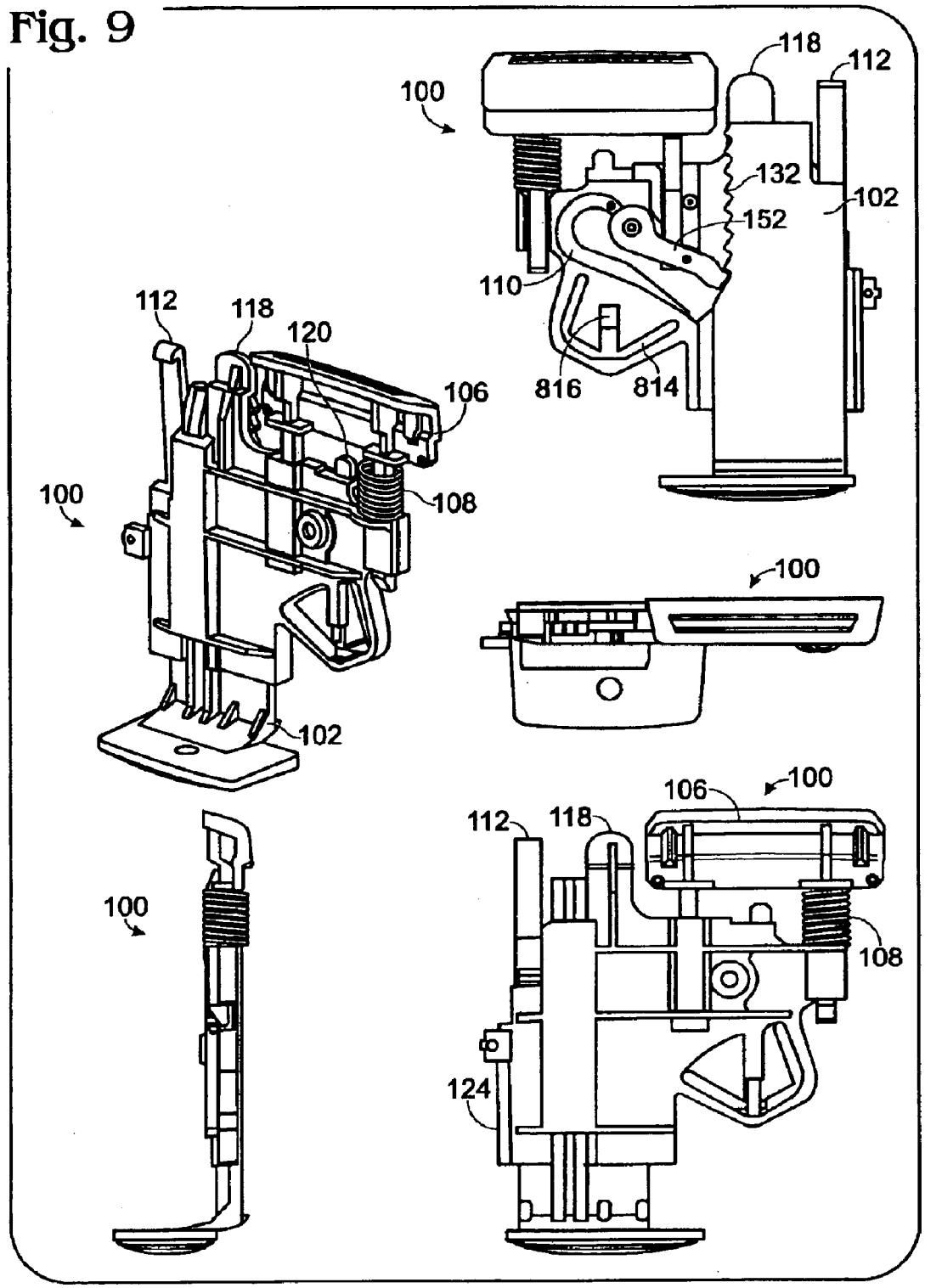

ELEVATOR ASSEMBLY FOR A PROJECTION DEVICE

CROSS-REFERENCE TO RELATED APPLICATIONS

The present application claims priority under 35 U.S.C. § 119 to U.S. Provisional Patent Application Ser. No. 60/475,244, which was filed on Jun. 2, 2003. The disclosure of that application is hereby incorporated by reference in its entirety for all purposes.

TECHNICAL FIELD

The present disclosure relates generally to elevator assemblies for electronic devices, including projection devices.

BRIEF DESCRIPTION OF THE DRAWINGS

The disclosure is illustrated by way of example and not by way of limitation in the figures of the accompanying drawings, in which the like references indicate similar elements and in which:

FIG. 3 is an enlarged view of the elevator assembly coupled to the interior front wall of a projection device according to an embodiment of the present disclosure. The elevator assembly is shown with a foot extension in a lowered position.

FIG. 3A is a cross-sectional view taken along the lines 3A—3A of FIG. 3.

FIG. 9 includes a plurality of views of the elevator assembly according to an embodiment of the present disclosure.

DETAILED DESCRIPTION

Projection devices may be used to project or display an image. Typically, projection devices include a lamp assembly, having a lamp or other light source, linked to a light engine or optical engine. Light may be directed from the light source through the light engine to a display surface. The lamp assembly typically includes a lamp mount configured to hold the lamp in a desired position and location within the projector.

In embodiments described below, a retractable support structure, such as an elevator assembly, for a projection device is provided. Adjustment of the angle of light from the projection lens may be beneficial due to the position of the display surface. The elevator assembly may be adjustable such that a user may selectively position the pitch of the projection device such that an image is projected to a desired position on the display surface. In some embodiments, the elevator assembly is adapted to minimize or reduce the amount of space required to provide an adjustable foot mechanism and/or to reduce airflow restriction thereby enabling improved cooling. The reduced-sized elevator assembly may be more easily incorporated into today's small projection devices. Moreover, in some embodiments, and as discussed below, the elevator assembly further may be adapted to be mounted to a surface without the use of screws or other similar fasteners, thus enabling easier installation of the elevator assembly.

Figure 1:
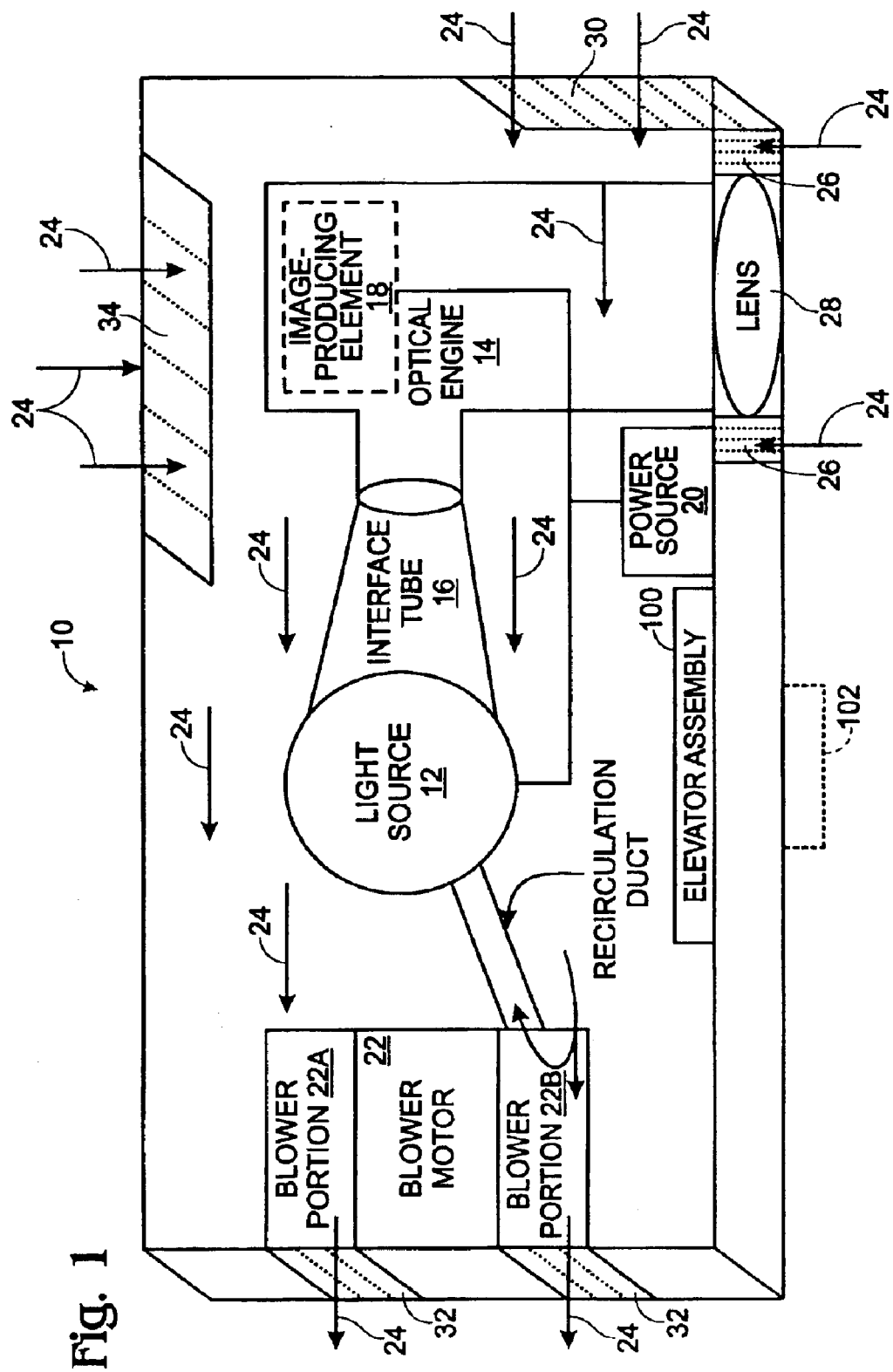
FIG. 1 is a schematic illustration of an exemplary projection device including an elevator assembly according to an embodiment of the present disclosure.

Referring now specifically to FIG. 1, a projection device 10 is illustrated. Projection device 10 may be adapted to project an image on a display surface, including, but not limited to, a screen, a wall, or other viewing surface or area.

In some embodiments, projection device 10 may be a projector or image-generating device that is able to project an image onto a display surface. As used herein, a projection device or image-generating device may include any suitable display device or image projector, including, but not limited to, a digital projector, a liquid crystal display (LCD) projector, a digital light processing projector, etc. Moreover, projection device 10 may be configured as a front projection device or a rear projection device.

In its most basic form, projection device 10 may include a light source (or lamp) 12 and an optical engine (or light engine) 14. Light source 12 may be adapted to produce a beam of light and project the light towards optical engine 14, which may be configured to generate an image. In some embodiments, light source 12 may include a lamp positioned within a reflector that is configured to direct most of the emitted light along an optical path of the system. The light source may include any suitable type of lamp. Examples include, but are not limited to, metal halide lamps and ultra-high-pressure (UHP) arc lamps, etc. The system also may include one or more filters, such as an infrared (IR) or ultraviolet (UV) filter, to filter out unwanted parts of the emission spectra of the lamp.

Light produced from light source 12 may be channeled or directed along an optical path through an interface tube or spacer 16 to optical engine 14. Optical engine 14 may include filters, color wheels, lenses, mirrors, integrators, condensers, other optical elements, or combinations thereof.

Typically, optical engine 14 includes an image-producing element 18, and other optics. Image-producing element 18 may include any suitable image-generation device, including, but not limited to, a digital micromirror (DMD), an LCD panel, or any other suitable image source. Image-producing element 18 may be configured to project light toward one or more mirrors or other optics, which, in turn, may be configured to reflect light toward a display surface.

Projection device 10 also may include one or more power sources 20. Power source 20 may be linked to light source 12, image-producing element 18, and/or other components of projection device 10.

Figure 2:
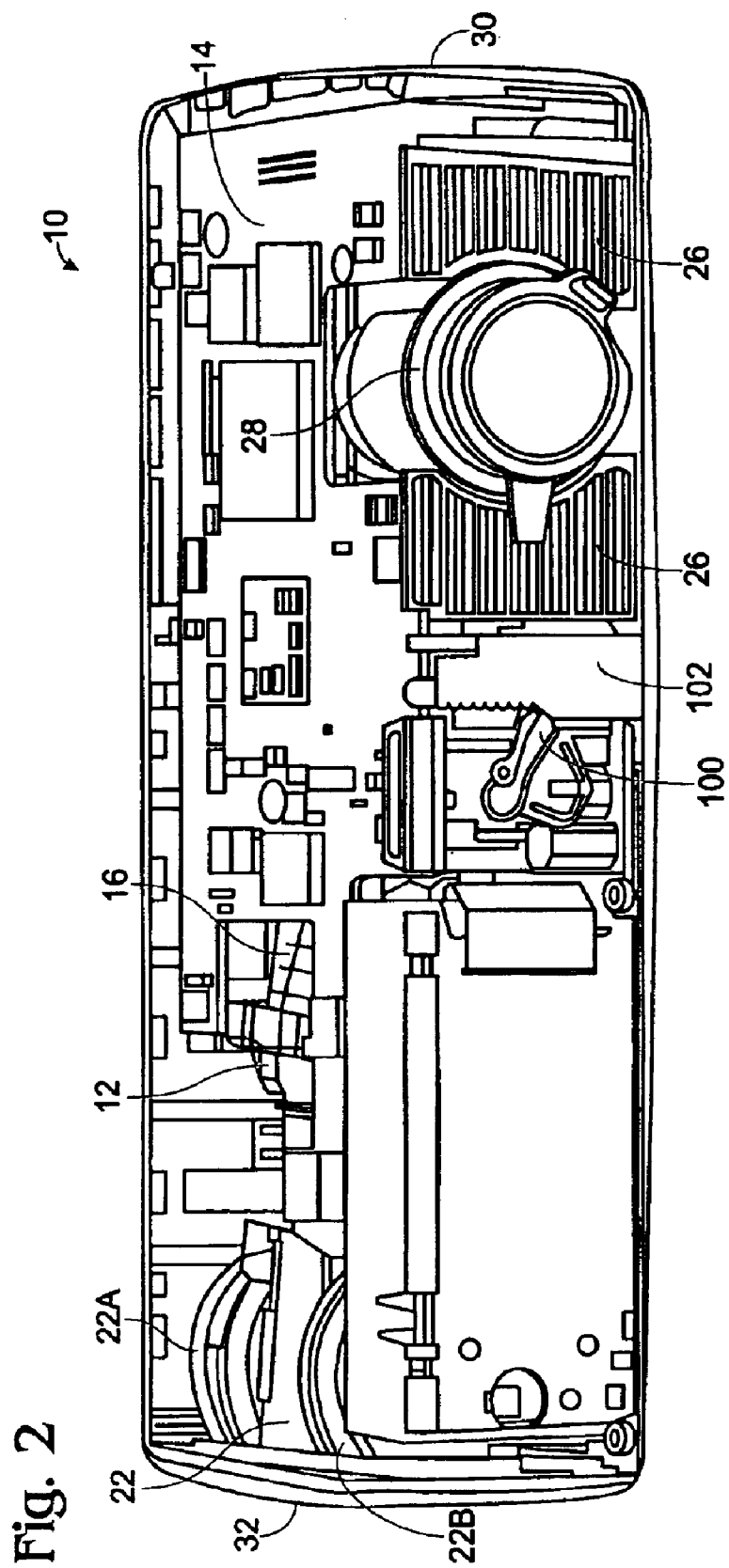
FIG. 2 is another schematic illustration of an exemplary projection device including an elevator assembly.

FIGS. 1 and 2 further illustrates the above components in an exemplary embodiment. In addition, other features and components of projection device 10 may be seen. For example, blower motor 22 is shown in FIGS. 1 and 2 and includes a first blower portion 22A and a second blower portion 22B. Blower motor 22 creates airflow through projection device 10 illustrated by arrows 24. Airflow enters projection device 10 through various inlet vents, such as, for example, front inlet vents 26 positioned on sides of lens 28, inlet side vents 30 positioned on an opposite side from exit vents 32, and rear vents 34 positioned opposite inlet vents 26. Blower portions 22A and 22B may be configured to force airflow to exit projection device 10 through exit vents 32 positioned adjacent thereto. These ventilation paths may permit air to flow past the light source to provide cooling thereby permitting a reduced size projection device.

Referring back to FIG. 1, projection device 10 may further include a selectively adjustable support means, such as an elevator assembly 100. Elevator assembly 100 may enable a user to selectively adjust the angle of the projection device relative to a reference surface. Such adjustment capabilities may enable a user to selectively position an image on a display surface. For example, a user may be able to change the vertical position of the projected image on a display surface. Thus, a user may adjust for the size of a projected image and the position of the projection device by use of elevator assembly 100.

Still referring to FIG. 1, elevator assembly 100 typically includes a foot extension 102 which may be adapted to contact the reference surface (or support surface) and further support projection device 100 at a desired angle from the reference surface. Elevator assembly 100 should be robust enough to support the weight of projection device 10. Moreover, in at least some of the examples described herein, elevator assembly 100 is robust enough to support additional arbitrary loading, such as dropping the unit, placing objects, such as books, bags or cases on the unit, etc. In one example, elevator assembly 100, and some or all of its components, may be constructed of plastic to reduce cost and weight. Alternatively, metals, composites, or other types of materials could be used, if desired.

A portion of elevator assembly 100 may be contained within the body of projection device 10. In some embodiments, such as the embodiment illustrated in FIG. 2, elevator assembly 100 may be disposed along the front interior portion of projection device 10. For example, elevator assembly 100 may be actuated through a button on the top of the projection device case. Although elevator assembly 100 may be positioned in any suitable location within the projection device, in some embodiments, elevator assembly 100 may be centrally disposed. Further, in another embodiment, elevator assembly 100 may be centrally disposed at the front interior portion of projection device 10. Thus, elevator assembly 100 can be adapted to both lift and support the front middle of projection device 10 such that operation of elevator assembly 100 results in both sides of projection device 10 being raised approximately the same distance from the reference surface.

As shown in more detail in the embodiment of FIG. 2, by positioning elevator assembly 100 in the front portion of projection device 10, and due to the narrow profile of elevator assembly 100, it is possible to have a smaller projector size, while also providing sufficient airflow to cool the projection device components. Further, this functionality is achieved while still providing a stable adjustment mechanism so that the relative height of the projection device can be easily adjusted to various positions by a user.

FIG. 3 further illustrates elevator assembly 100 attached to an interior front wall of projection device 10 according to an embodiment of the present disclosure. The exemplary elevator assembly includes five primary components. Specifically, the illustrated elevator assembly includes a foot extension 102, a main bracket 104, a button 106, a spring 108 and a pawl 110.

Referring back to FIG. 3, bracket 104 may be a one-piece substantially planar support. For example, in one embodiment, bracket 104 provides a rigid structure with which the moveable parts of elevator assembly 100 (pawl 110, foot extension 102, button 106 and spring 108) may be operatively mounted. Each of the components is operatively connected to other components within the elevator assembly. For example, pawl 110 may be retained in main bracket 104 by an integral pivot boss 130 such that it engages the gear rack 132 of foot extension 102 (described in more detail below). Pawl 110 may be spring-loaded to provide an engaging force in the direction that engages the end of the pawl with gear rack 132 of foot extension 102. Moreover, button 106 within elevator assembly 100 may be operatively connected to pawl 110 such that depression of button 106 releases the engagement of pawl 110 (by compressing pawl 110) with any one of a plurality of notches in gear rack 132 of the foot extension 102. Release of foot extension 102 from pawl 110 enables foot extension 102 to move upwards into a retracted position. Also, due to the plurality of notches in gear rack 132, a variety of angles between projection device 10 and a reference surface can be achieved.

Typically, pawl 110 is a spring-loaded pawl that may pivot upon contact with button 106 of elevator assembly 100. For example, in some embodiments, pawl 110 may be c-shaped and provide spring tension such that upon release of button 106, pawl 110 rebounds into one of the notches. Although a c-shaped pawl is disclosed, it should be appreciated that other configurations for pawl 110 are contemplated and are within the scope of the disclosure.

A spring 108 may also be provided. Spring 108 may be operatively attached to button 106 and main bracket 104 such that button 106 is configured to adequately recover from depression to an original position. For example, button 106 may operatively engage pawl 110 at a single location (152, see also FIG. 9), or at multiple locations. In one example, spring 108 may be a coiled metal spring, although other spring types can be used.

Further, spring 108 can have a similar spring rate as the effective spring rate of pawl 110 (e.g., in the direction of compression about boss 130), so that smooth depression of the button is possible. In other words, by providing parallel acting spring forces (form coil spring 108 and pawl 110, respectively), potential skewing of button 106 is reduced that might otherwise occur if the effective spring force were off-center creating a mechanical moment twisting button 106 in its guides 134 and 136 (in main bracket 104).

As briefly described above, pawl 110 includes various features which are described in more detail below with regard to FIG. 6 (which further illustrates the operative relationship between pawl 110 and foot extension 102). In particular, pawl 110 includes an integrated first arm 140 and a second integrated arm 142, such as a curved leaf spring. First arm 140 may be adapted to engage notches within gear rack 132 of foot extension 102. For example first arm 140 may include an engagement portion that extends into a notch and is retained by the upper surface of the notch (also referred to herein as teeth).

Figure 5:
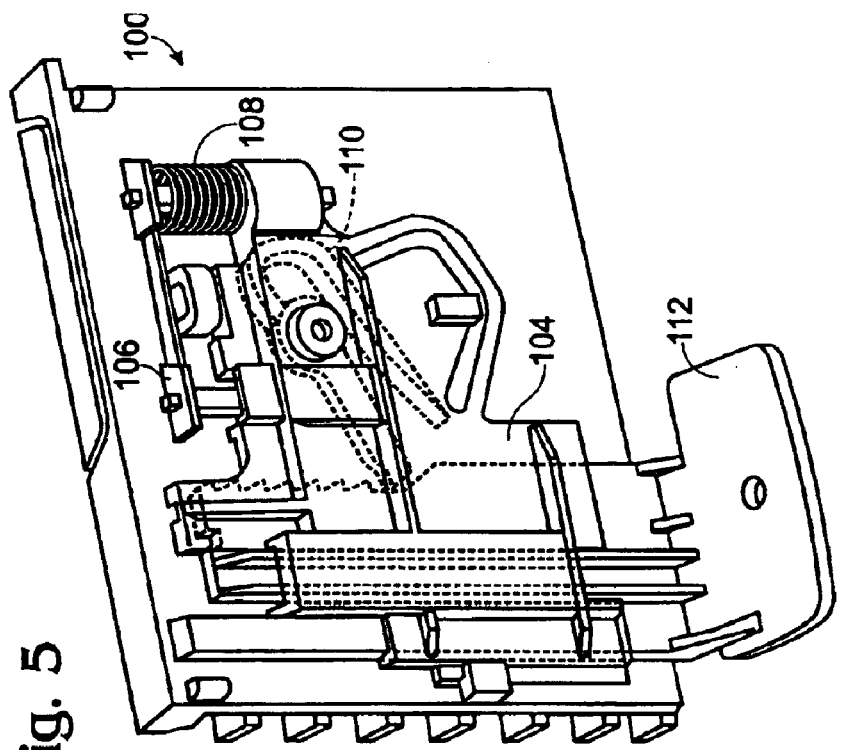
FIG. 5 is a perspective view of the elevator assembly of FIG. 3 with the foot extension in a raised position.
Figure 4:
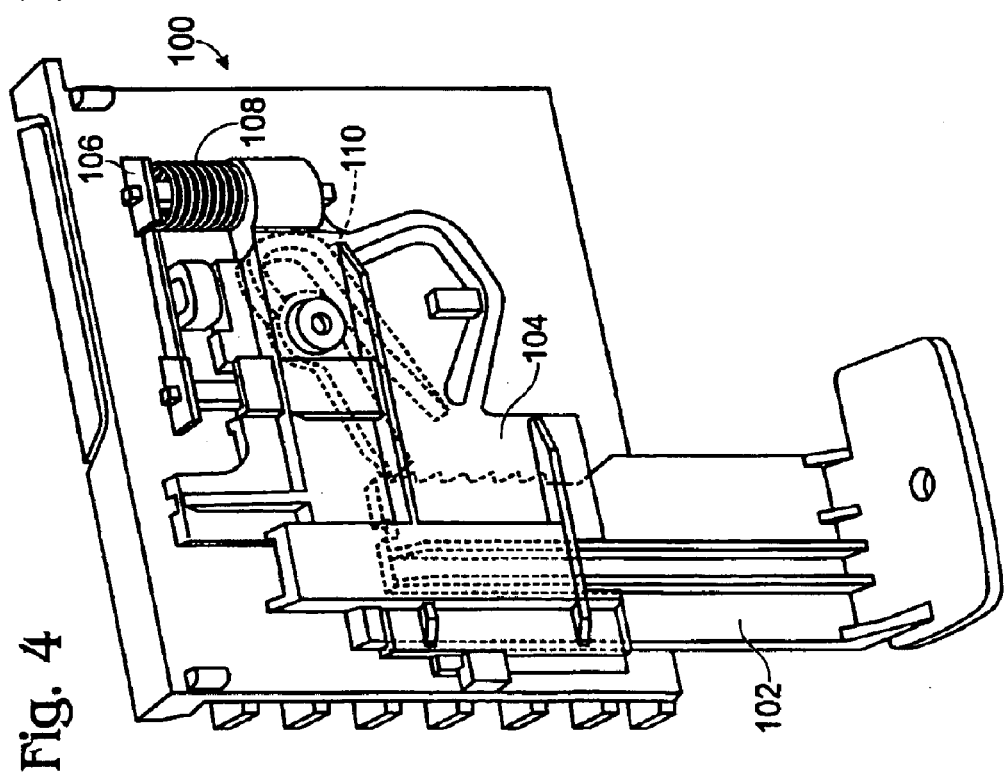
FIG. 4 is a perspective view of the elevator assembly of FIG. 3 with the foot extension in a lowered position.

In other words, foot extension 102 may include a ratchet portion with notches adapted to receive the engagement portion of pawl 110 such that foot extension 102 is retained in a selected position. For example, FIGS. 3 and 4 illustrate foot extension 102 in a lowermost position. Other positions may be selected such that the engagement portion of pawl 110 is received in other grooves in the extension portion. For example, FIG. 5 illustrates foot extension 102 in the uppermost raised (or retracted) position. When foot extension 102 is in the uppermost raised position, the pawl engages the lowest notch on the foot extension. It should be appreciated that any number of notches or similar features may be used to provide the selective positioning described above.

Figure 6:
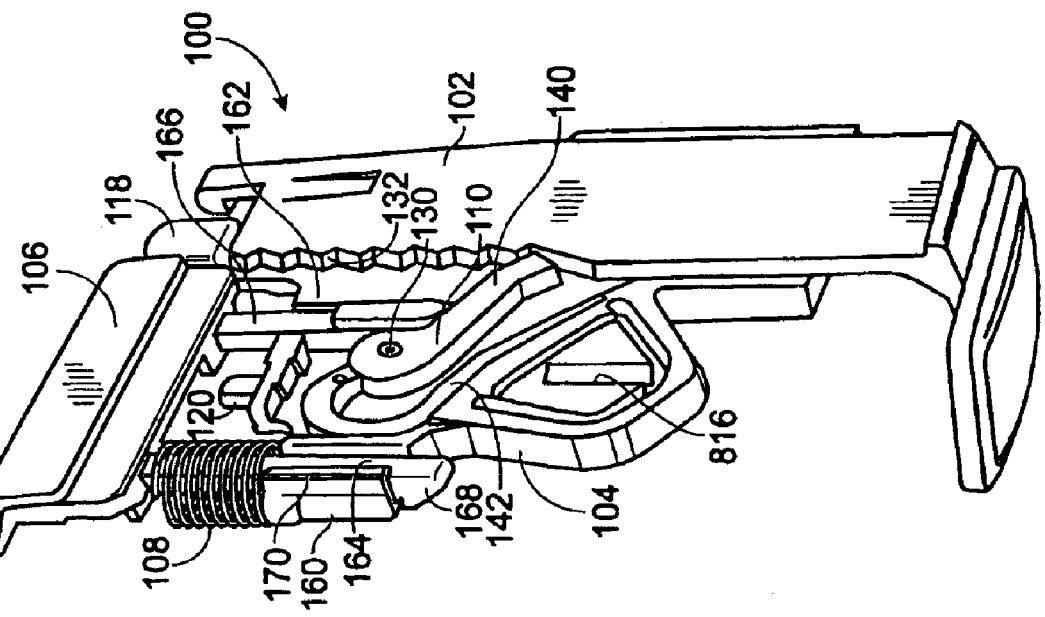
FIG. 6 is a rear perspective view of the elevator assembly shown in FIG. 3.

Continuing with FIG. 6, actuation of button 106 depresses first arm 140 to disengage it from the notches. In other words, second arm 142 of pawl 110 is retained by a surface of main bracket 104 such that depression of button 106 causes first arm 140 to pivot about the axis boss 130, and compress pawl 110. The c-shape of pawl 110 assists in allowing the compression to occur with a desired amount of compression force resulting in a desired amount of movement of first arm 140. As shown in FIG. 6, pawl 110 has a thicker upper portion with an end that engages gear rack 132, and a thinner cross-section at the c-shaped end, and the lower portion. By varying the thickness in this way, pawl 110 bends about the c-shaped end to provide the desired motion enabling the end of the upper portion to disengage rack 132 by further compressing pawl 110.

Figure 8:
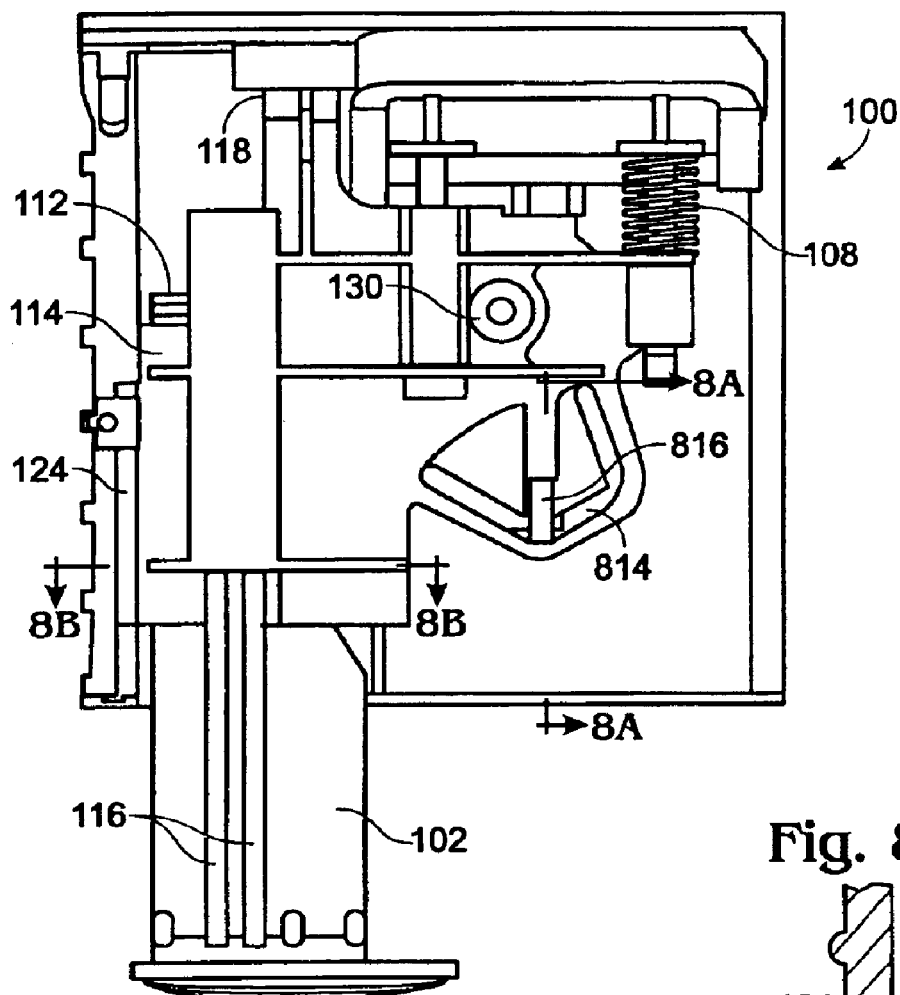
FIG. 8 is another schematic view of an exemplary elevator assembly including cross sections of the elevator assembly according to an embodiment of the present disclosure at approximately 5:1 scale.

It should be appreciated that the foot extension 102 is adapted to slide along a track 116 (indicated in FIG. 3). In some embodiments, track 116 may be composed of one or more ribs within main bracket 104. However, other track or sliding configurations are possible. In this particular example, two parallel ribs are used and are illustrated in more detail with regard to FIG. 8, for example. As shown in FIG. 8, the two parallel ribs provide an alignment groove, preventing the foot extension from slipping in a lateral direction. The track 116 further may provide reinforcement to the foot extension such that the foot extension is able to adequately support the projection device. Thus, the ribs may synergistically operate as strengthening and guiding ribs.

It further should be noted that foot extension 102 may be a gravity-fed foot extension and limit stops may be provided to prevent the foot extension from slipping out from main bracket 104. For example and as indicated in FIG. 3, the foot extension may include one or more protrusions or other features, such as protrusion 112, adapted to engage a portion 114 of the main bracket. Protrusion 112 may operate to prevent the unintentional release of the foot extension from the foot assembly.

FIG. 6 also illustrates first track 160 and second track 162 of bracket 104 which retain extension shafts 164 and 166, respectively, of button 106. In one example, shafts 164 and 166 are rectangular in cross-section, although they may also be circular, if desired. Further, shaft 164 includes an extension 168 at its end to prevent button 106 from coming out of bracket 104 after assembly. Further, track 160 may include a retaining clip feature 170 for retaining shaft 164, while also enabling snap fit installation of button 106 in bracket 104.

Elevator assembly 100, as described herein, has a very small profile that requires a minimum amount of the footprint of projection device 10. Such a minimal profile enables the elevator assembly to be used in small-sized projection devices and other electronic devices. Moreover, as described, the thin foot extension and the pawl with integral spring and short vertical actuator is configured to simplify and enable reduction in space requirements for the elevator assembly within a device.

Turning now to main bracket 104, as shown, main bracket 104 may be secured to the projection device housing 150 using a snap-fit configuration. Specifically, as indicated in FIG. 3, multiple retention features may be used to secure main bracket 104 to the interior of housing wall 150 of projection device 10. The retention features of bracket 104 may mate with features on wall 150, which may operate to retain main bracket 104 securely within projection device 10 without the use of screws, pins, etc. Although, in one embodiment, such screws or other fasteners can be used in addition to the snap-fit connection, if desired.

For example, in one embodiment, the main bracket may include multiple alignment features or tabs, including, but not limited to, a gross or coarse alignment tab 118 and a fine alignment tab 120. Additionally, one or more supplemental alignment features may be provided, such as feature 122. This supplemental feature may prevent or reduce movement from side-to-side. Each of these features mates with corresponding pockets in bracket 104. By having a coarse and fine alignment tab, it is possible to provide easier assembly and construction of the projection device.

Figure 7:
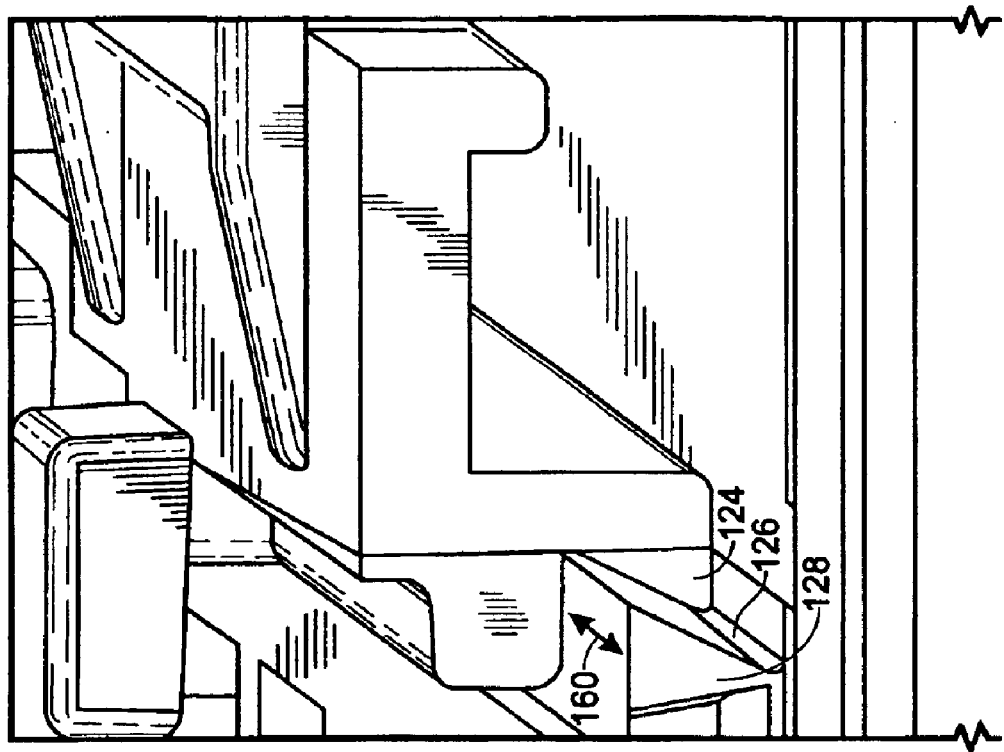
FIG. 7 is an enlarged view of a portion of the elevator assembly coupled to the interior side wall according to an embodiment of the present disclosure.

One or more of the features of the elevator assembly may have specialized joints. For example, main bracket 104 may further include an alignment feature along one or more sides of the bracket. For example, main bracket 104 may include structures, which enable main bracket 104 to be dovetailed to corresponding structures molded onto the interior wall 150 of projection device 10. For example, as illustrated in more detail in FIG. 7, the main bracket may include one or more tenons, such as a partial fan tenon 124, adapted to be inserted within a mortise or groove 126 formed by a tail or portion of a tail 128 extending from interior wall 150 of projection device 10 to form an interlocking joint. Such a joint is configured to securely hold the main bracket, and thus, the entire elevator assembly, in place relative to the wall of the projection device. Such a joint may eliminate the need to use screw-like devices or additional fasteners to install and secure the elevator assembly. By eliminating the screw-like devices and other metal parts, the elevator assembly may be positioned such that it abuts or is adjacent to sensitive components, such as high-voltage portions of a power supply, etc. Moreover, in some embodiments, main bracket 104 further may provide electrical isolation for the enclosure from the power supply components, such as power source 20.

Other portions of the main bracket may be dovetailed. For example, another exemplary portion of the main bracket that may be dovetailed is shown in the cross-section of FIG. 3A. It should be appreciated that other portions of the main bracket may be dovetailed to enhance the snap fit of the main bracket.

Assembly of elevator assembly 100 within a projection device may be simplified by the configuration described herein. For example, assembly of elevator assembly 100 may include positioning of pawl 110, spring 108, button 106 and foot extension 102 within main bracket 104 and snapping the main bracket onto the mating wall 150. Screws do not need to be subsequently positioned within the bracket or other components, although they can be used if desired.

Also, the above dovetailed attachment may be useful when used with the fine and course tabs 118 and 120. Specifically, the dovetailed attachment does not require precise alignment along the direction indicated by arrows 160 of FIG. 7. However, tabs 118 and 120 provide such alignment, thereby allowing accurate, yet easy, assembly. In other words, accurate assembly of elevator assembly 100 into projection device wall 150 can be achieved without difficult and time consuming alignment required by previous approaches.

Figure 8A:
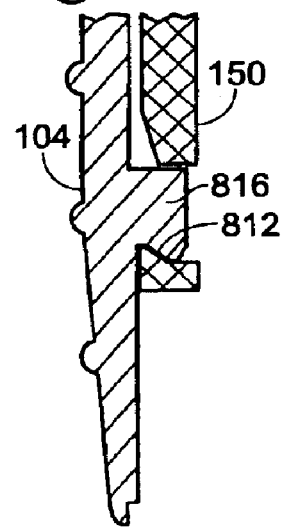
FIG. 8A is a cross-sectional view taken along the line 8A in FIG. 8.
Figure 8B:
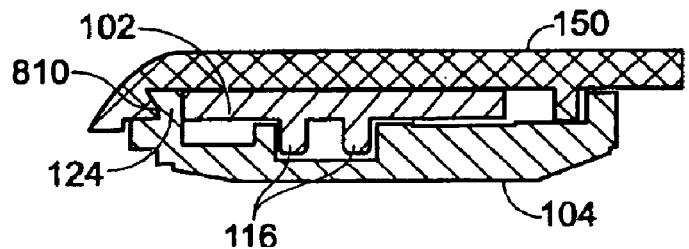
FIG. 8B is a cross-sectional view taken along the lines 8B—8B of FIG. 8.

FIG. 8 also illustrates several examples of snap fit joints in different planes of bracket 104. Specifically, FIG. 8B (section 8B to 8B) shows a first dovetailed joint at 810 (formed by tenon 124), and FIG. 8A (section 8A to 8A) shows a second dovetailed joint at 812. Since the joints are in different planes, they may act to secure bracket 104 to projection device 10 and reduce movement in multiple directions. For example, joint 810 may reduce lateral movement of elevator assembly 100, while joint 812 may reduce vertical movement of elevator assembly 100.

Referring back to FIG. 6, the planar structure of elevator assembly 100 may be understood. In the depicted embodiment, pawl 110 is located adjacent the upper portion of foot extension 102 in a common plane. Further, button 106 is located adjacent the upper portion of foot extension 102 and pawl 110 in this common plane. In this way, a narrow profile can be achieved for assembly 100 that uses a minimum or reduced amount of the footprint of projection device 10.

FIGS. 8–12 further illustrate an exemplary elevator assembly. Specifically FIG. 8 is a schematic view of an exemplary elevator assembly including cross sections of the elevator assembly 100. FIG. 8 identifies several snap fit joints that may be used to assembly elevator assembly 100 to projection device 10, including at 810 and 812. As discussed above, bracket 104 may include one or more tenons, such as a partial fan tenon 816, adapted to be inserted within groove (not shown) formed by a tail or portion of a tail extending from interior wall 150 of projection device 10 to form an interlocking joint. To ease assembly of the elevator assembly 100, the portion of bracket 104 forming the tenon 816 may include a hole 814 to enable tenon 816 to bend easier relative to bracket 104. In one example, the ease of assembly may be further enhanced by supplemental alignment features 122 which acts to align tenon 816 in a desired location during the snap fit installation. Further, other tenons may be used to form additional joints, if desired.

FIG. 9 includes a plurality of views of the elevator assembly according to an embodiment of the present disclosure.

Although the present exemplary embodiments illustrate the use of an elevator assembly in a projection device, it should be appreciated that the elevator assembly may be used in any suitable device that may be selectively positioned at a variety of angles relative to a support surface. For example, the elevator assembly may be used in electronic devices, such as televisions, display monitors, radios, speakers, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device comprising:

a light source;

an optical engine receiving light produced from the light source and configured to generate an image;

a ventilation path configured to permit air to flow past the light source to provide cooling to the device; and an elevator assembly configured to support the device and sized to reduce interference with the flow of air through the ventilation path, wherein the elevator assembly comprises:

a foot extension configured to contact a reference surface, said foot extension having a rack;

a bracket configured to support the foot extension and slidably couple the foot extension with said housing of the projection device via a snap fit connection, wherein said bracket includes at least one tenon adapted to be coupled to a groove in said housing to form said snap fit connection; and a pawl adapted to be actuated by a user, said pawl engaged with said rack of said foot extension in a spring-loaded orientation forcing an end of said pawl towards said rack.

2. A projection device comprising:

a light source;

an optical engine receiving light produced from the light source and configured to generate an image;

a ventilation path configured to permit air to flow past the light source to provide cooling to the device; and an elevator assembly configured to support the device and sized to reduce interference with the flow of air through the ventilation path, wherein the elevator assembly comprises:

a foot extension configured to contact a reference surface, said foot extension having a rack;

a bracket configured to support the foot extension and slidably couple the foot extension with said housing of the projection device; and a pawl adapted to be actuated by a user, said pawl engaged with said rack of said foot extension in a spring-loaded orientation forcing an end of said pawl towards said rack, wherein said pawl has at least a C-shape portion that provides said spring-loaded force.

3. A projection device comprising:

a light source;

an optical engine receiving light produced from the light source and configured to generate an image;

a ventilation path configured to permit air to flow past the light source to provide cooling to the device; and an elevator assembly configured to support the device and sized to reduce interference with the flow of air through the ventilation path, wherein the elevator assembly comprises:

a foot extension configured to contact a reference surface, said foot extension having a rack;

a bracket configured to support the foot extension and slidably couple the foot extension with said housing of the projection device, wherein said bracket includes a first coarse alignment tab and a second fine alignment tab; and a pawl adapted to be actuated by a user, said pawl engaged with said rack of said foot extension in a spring-loaded orientation forcing an end of said pawl towards said rack.

* * * * *